G. EVANS.
COMBINED POSTHOLE DIGGER, WIRE TIGHTENER, AND CROWBAR.
APPLICATION FILED DEC. 6, 1918.
1,336,027. Patented Apr. 6, 1920.
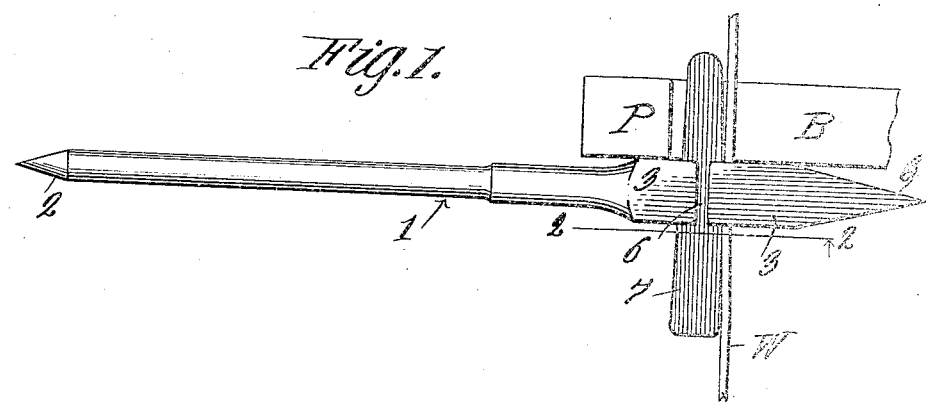
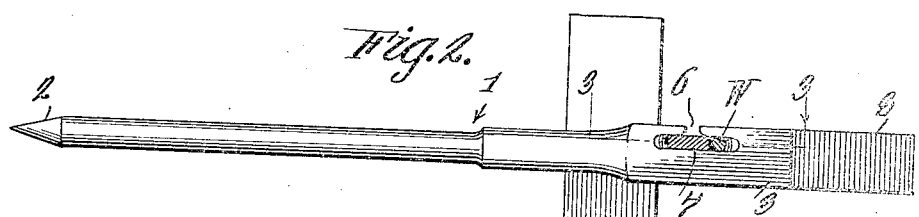
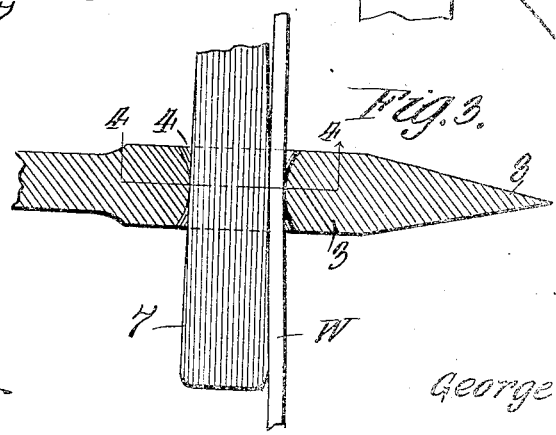
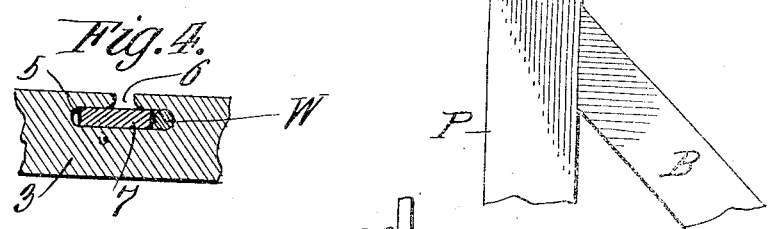
Witnesses
Guy M. Spring
S. W. McColl
Inventor
George Evans
By Richard Bowen, Attorney

UNITED STATES PATENT OFFICE.

GEORGE EVANS, OF ELNORA, ALBERTA, CANADA.

COMBINED POSTHOLE-DIGGER, WIRE-TIGHTENER, AND CROWBAR.

1,336,027.  Specification of Letters Patent.  Patented Apr. 6, 1920.

Application filed December 6, 1918. Serial No. 265,587.

*To all whom it may concern:*

Be it known that I, GEORGE EVANS, a subject of the King of Great Britain, residing at Elnora, in the Province of Alberta and Dominion of Canada, have invented certain new and useful Improvements in Combined Posthole-Diggers, Wire-Tighteners, and Crowbars, of which the following is a specification.

This invention relates to compound tools or implements and more particularly to those adapted for use in the construction of wire fences.

The object of the invention is to provide a simply constructed, cheap and strong implement of this character, capable of use as a post-hole digger, a wire stretcher or tightener, and a crowbar.

Another object is to provide a tool of this character having efficient wire clamping means whereby a wire strand may be securely held while being stretched without danger of mutilating or breaking it.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a top plan view of a tool constructed in accordance with this invention with the wire shown engaged thereby and the tool operating as a wire stretcher.

Fig. 2 represents a section taken on the line 2—2 of Fig. 1.

Fig. 3 is a detail transverse section taken on the line 3—3 of Fig. 2, and

Fig. 4 is a detail sectional view taken on the line 4—4 of Fig. 3.

In the embodiment illustrated, a fence post P is shown with a brace B for supporting it, and a fence wire W which is designed to be secured to the post. These members may be of the character and construction usually employed in wire fences, and form no part of the invention, but are shown for the purpose of illustrating the application of the implement constituting the invention.

This implement comprises a bar 1 composed of suitable material, preferably of steel, and which may be of any desired or suitable length, the usual length being about four feet, six inches. This bar has one end pointed as shown at 2 to facilitate the use of the bar in penetrating hard earth. Arranged in the large end or head 3 of the bar 1 is a wire-receiving opening 4 here shown substantially T-shaped in form, the head portion 5 of said opening extending transversely through the bar, the stem or shank portion 6 of the opening extending through one side wall of the bar and being designed to permit the insertion of the wire W into the opening as well as to permit its removal. This opening forms wire-receiving seats which are rounded or curved to facilitate the manipulation of the wire W without breakage or injury thereof. After the wire W has been inserted as shown in Fig. 1, a clamping wedge 7 is driven into the head portion 5 of the T-shaped opening, thereby securely clamping the wire W in one end of the opening, as is shown clearly in Figs. 1, 2 and 3. When this wedge is so inserted it will be obvious that the wire W will be firmly held in engagement with the bar 1 and that this bar may then be operated for exerting tension on the wire W to tighten it and permit its being secured to the post P by staples in the ordinary manner.

When it is desired to use this implement as a crowbar or post-hole digger, the wedge 7 may be inserted in the opening 4 to operate as a reinforce for the bar at this point and assist it in resisting strains, so that there will be no liability of its breaking at this point. This wedge also performs the same function when it is used as a clamping member, greatly strengthening the bar at the point where the wire is engaged therewith.

As shown, the bar 1 has a chisel-point 8 at its larger end or head to facilitate its being driven into the earth when used as a posthole digger or as a crowbar.

Having thus fully described my invention, what I claim as new and desire to secure by Letters Patent, is:—

1. An implement of the class described, comprising a bar having a wire-receiving opening extending transversely therethrough, with an opening through one side wall of the bar midway the length of said first-mentioned opening to afford access to said opening to permit the insertion and removal of a wire, the end walls of said first-mentioned opening being convex and rounded at their outer sides to prevent breakage of the wire.

2. An implement of the class described, comprising a bar having an enlarged head with a wire-receiving opening extending transversely therethrough, one side wall of said opening having a slot midway its length to afford access to said opening to permit the insertion and removal of a wire, the end walls of said opening being convex, and a combined wire-clamping wedge and bar reinforce removably inserted in said opening.

In testimony whereof I affix my signature in presence of two witnesses.

GEORGE EVANS.

Witnesses:
   THOMAS SISESMITH,
   H. G. SMITH.